United States Patent Office 3,056,681
Patented Oct. 2, 1962

3,056,681
PROCESS OF MANUFACTURING DEHYDRATED POWDERED CHEESE
Russell H. Rogers, Detroit, Mich.; Elsie C. Rogers, executrix of said Russell H. Rogers, deceased
No Drawing. Filed Oct. 27, 1960, Ser. No. 65,287
4 Claims. (Cl. 99—116)

This invention relates to the manufacture of cheese and particularly cheese in a dehydrated powdered form, suitable for flavoring various food products.

In dehydrating cheese, and particularly Cheddar cheese, considerable protein digestion occurs during ripening and this breakdown of protein constituents is largely responsible for flavor characteristics acquired by the cheese. Such breakdown results largely from enzymes which are present in the milk from which cheese is made, and also from the enzymes rennin and pepsin which are usually added at the time of clotting the milk to a solid form. Bacterial action occurring during cheese ripening is also a factor in inducing a breakdown of protein constituents. In some of various types of hard cheese, such as Cheddar and Swiss, there is little chemical action on milk fat, but in other types of such cheese, as blue or Roquefort, there is formed a mold, *Penicillium roqueforti*, which secretes the enzyme, lipase, which breaks down the milk fat into some of the free fatty acids, thus being probably responsible for the peppery flavor of such cheese.

Temperatures ranging from 180° to 190° F. have commonly been employed for dehydration in the art prior to the present invention, and when the product is so heated, there has occurred a marked escape of the volatile flavors which should preferably be retained. Such escape is readily perceptible to the nose of anyone in proximity to the heated product. In some prior art processes, there have been applied temperatures as high as 300°, resulting in such a pronounced volatilization as to greatly detract from flavor characteristics of the cheese.

An object of the invention is to avoid subjection of cheese in its process of dehydration to any temperature high enough to induce a material escape of volatile flavors.

Another object is to deliver the cheese in melted form into water maintained at or slightly above the melting point of the cheese, and to circulate such cheese and water, as by a pump, for a period of time adequate to effect complete pasteurization.

Another object is to utilize the described circulation to reduce the cheese to quite small particles such as will form a powder, when drying of such particles has been effected.

Another object is to effect a drying of the cheese in spray form while maintaining certain beneficial temperature conditions.

These and various other objects are attained by the process hereafter described and claimed. The cheese is first reduced in any ordinary manner to a lump form, and is then circulated in water which forms a carrier for the cheese and regulates the cheese temperature. The percentage of solids with respect to the circulating mixture may vary from 35% to 42% by weight. The circulation may be maintained by a pump or by any other suitable device. It is preferred to maintain the described circulation for at least thirty minutes, the purpose being to assure complete pasteurization. The preferred temperature of the circulating mixture is 160° F., this being at least the approximate melting point of the cheese. The circulatory flow also breaks up the lumps, reducing them to the form of quite small particles.

The mass of cheese and water is now cooled to substantially 140° F. and is then homogenized in any suitable apparatus at a pressure ranging from 2500 to 5000 p.s.i. Thereafter the product is spray-dried at an air temperature not above 165° F. and a product temperature not exceeding 140° F. As the drying operation proceeds, the dried powder is progressively removed from the dryer, being then cooled to approximately 90° F., preferably by employing mechanical refrigeration. The product is then deposited in any suitable containers, and remains therein for at least forty-eight hours to allow the fat in the cheese to set up. Thereupon, by use of a suitable screen or screens, the product is sifted to eliminate any lump formations, being then ready to package for the trade.

The specified delay in screening and packaging the product is of decided importance since in absence of such delay, the product will form at least a few objectionable lumps within two or three weeks after sifting.

By minimizing temperatures employed in the described process, any material escape of volatile flavors is eliminated, and the resultant cheese is more desirably full flavored than the products resulting from prior processes.

What I claim is:

1. The process of manufacturing dehydrated cheese including depositing the cheese in a body of water to form a mixture with said body, maintaining such mixture at a temperature only slightly above the melting point of the cheese, while circulating the mixture through a definite path for a period of at least thirty minutes, and thereby effecting a complete pasteurization and also reducing the cheese to the form of uniformly small particles, cooling the mixture to a temperature approximating 140° F., homogenizing the mixture and spray-drying the mixture at an air temperature not above 165° F. and a product temperature not exceeding 140° F.

2. In the process as set forth in claim 1, the step of cooling the mixture to approximately 90° F. immediately subsequent to the spray-drying.

3. The process of manufacturing dehydrated cheese including depositing the cheese in a body of water to form a mixture with said body, maintaining such mixture at a temperature only slightly above the melting point of the cheese while continuously agitating the mixture throughout a time interval adequate to effect complete pasteurization and to reduce the cheese to the form of uniformly small particles, then cooling the mixture to approximately 140° F., homogenizing the mixture, drying the cheese while subjecting it to a temperature not exceeding 140° F., storing the dried cheese for a period of at least forty-eight hours to permit the fat content of the cheese to set up, and then screening the product to eliminate any lumps.

4. The process of manufacturing dehydrated cheese including depositing the cheese in a body of water to form a mixture with said body, maintaining such mixture at a temperature of approximately 160° F. while circulating the mixture through a definite path for a period of at least thirty minutes, and thereby effecting a complete pasteurization and also reducing the cheese to the form of uniformly small particles, cooling the mixture to a temperature approximating 140° F., homogenizing the mixture, and spray-drying the mixture at an air temperature not above 165° F. and a product temperature not exceeding 140° F.

References Cited in the file of this patent
UNITED STATES PATENTS

| | | |
|---|---|---|
| 2,252,170 | Doering | Aug. 12, 1941 |
| 2,701,202 | Silberman | Feb. 1, 1955 |
| 2,918,371 | Jaffe et al. | Dec. 22, 1959 |

FOREIGN PATENTS

| | | |
|---|---|---|
| 117,835 | Australia | Dec. 16, 1943 |